UNITED STATES PATENT OFFICE.

EMMET FRANCIS HITCH, OF ALTON, ILLINOIS, ASSIGNOR TO WESTERN CARTRIDGE COMPANY, OF EAST ALTON, ILLINOIS, A CORPORATION OF NEW JERSEY.

PICKLING PROCESS.

1,206,220.    Specification of Letters Patent.    Patented Nov. 28, 1916.

No Drawing.    Application filed August 25, 1916. Serial No. 116,782.

*To all whom it may concern:*

Be it known that I, EMMET FRANCIS HITCH, a citizen of the United States, residing at Alton, in the county of Madison and State of Illinois, have invented certain new and useful Improvements in Pickling Processes, of which the following is a specification.

This invention relates to pickling processes; and it comprises a method of pickling metals and, in particular, brass, copper and other copper-containing metals, wherein such metal is treated with a solution containing sodium bisulfate (niter cake) or other bisulfate, and chromate or bichromate of sodium or other base; all as more fully hereinafter set forth and as claimed.

In the pickling of metals sulfuric acid and other acids have long been used. The action in part depends upon a solution of underlying metal loosening the scale; and in part upon a solution of the oxids of the scale. Which action preponderates depends on the metal and on the pickle liquor. The scale on hot-worked iron generally consists of magnetic oxid, which, in turn, may be considered as composed of a lower or less oxidized oxid (ferrous oxid) and a higher or more oxidized oxid (ferric oxid). Since the solubility of ferric oxid in most acids is rather small, the action of pickles on scaled iron is generally mainly on the metal although pickles containing reducing agents, such as stannous chlorid, have been devised in the effort to have more of an oxid-dissolving function. Stannous chlorid converts ferric oxid into ferrous oxid which is much more soluble in acids.

In pickling copper and copper containing materials, such as brass, the action is quite different since the oxids are much more soluble in acids and the metal less soluble than is the case with iron. Copper also forms two oxids, cuprous and cupric, containing respectively less and more oxygen; and both these occur in copper scale. The scale is usually more or less layered, the layer next the air containing more of the black, or cupric oxid, while that next the metal contains more of the red, or cuprous oxid. When the outside scale is mechanically detached the metal is usually left covered with a skin or layer of fairly pure cuprous oxid. Of these two oxids, again unlike iron, the more oxidized, or cupric, oxid is more soluble in acids than the less oxidized, or cuprous, oxid.

In pickling copper goods with the usual pickles, therefore difficulties obtain. The metal not being attacked to any extent the scale does not loosen mechanically as it does with iron while the action goes from the surface inward, becoming slower the further it goes for the reason that the proportion of the less soluble cuprous oxid increases relative to the proportion of the more soluble cupric oxid.

In the present invention I have provided a method of pickling copper and cupriferous metals such as the brasses and bronzes, taking into account the stated considerations. In order to hasten the solution of the mixed oxids I provide in the bath an oxidizing agent capable of converting cuprous into cupric oxid. For a variety of reasons in providing such an agent I use chromic acid or a chromate capable of yielding it such as potassium bichromate or sodium bichromate. For reasons later appearing I find sodium bichromate the best agent.

Another component of the bath must be an acid material capable of dissolving copper oxid. But since in the presence of oxidizing agents, most acids are able to dissolve copper, I use a substance in which acidity is not so pronounced. The best material I have found is sodium bisulfate, or niter cake (so-called because it is a product formed in making nitric acid from nitrates).

Sulfuric acid, $H_2SO_4$, is of course a common pickling agent, being used not only for iron but for copper and brass. Sulfuric acid is however a dibasic acid; that is it contains two hydrogen atoms replaceable by metal. One or both of these hydrogen atoms may be replaced by a metal, forming an acid salt or a neutral salt, as the case may be. With only one replaced, that is where an acid salt like $NaHSO_4$ is formed, the resulting compound still possesses acid properties being capable of taking up half as much metal or base as the original acid. But the acidity, or avidity, of sodium bisulfate is of weaker character than that of the corresponding amount of free sulfuric acid, so that it is a less corrosive substance.

I have found that by using a pickling bath containing sodium bisulfate and sodium bichromate I can combine a good attack on the scale with little solvent power on the metal. The bisulfate dissolves the cupric oxid and the bichromate oxidizes the cuprous oxid sufficiently to permit solution and loosening of the scale while the two together do not materially attack the metallic copper.

Instead of sodium bisulfate I may use potassium bisulfate and instead of sodium bichromate I may use potassium bichromate, but in both cases I find the sodium salts much more advantageous for the reason that they do not tend to form the less soluble potassium chromium sulfate (chrome alum).

I may also use the described solution in pickling other metals than copper and brass; even for pickling iron and steel. I find that great advantage is obtained from the use of this particular solution or bath on scaled iron or steel although, for reasons stated ante, the oxidizing action of the chromate really should render the solution of the oxid slower while, as is well known, chromates exercise a shielding action against the oxidation of iron so that with this bath the usual solution of metal to cause a loosening of scale does not obtain to so great an extent as to where the niter cake alone, for example, is used. It is possible that this accelerated action on scale-covered iron and steel is due to other reasons: the oxidizing action of chromate on the small amount of grease or oil which is almost invariably present on scale coated iron or steel; an amount which is sufficient to prevent, ordinarily, quick wetting of the scale by the pickling bath. Whatever the reason may be, it is a fact that, rather unexpectedly, this particular bath has a stronger cleansing action on iron and steel than could be predicted from its character.

Instead of dichromates, other oxidizing agents such as neutral chromates, chlorates, perchlorates, nitrates, etc., may be employed; but for pickling brass and copper I find the bichromate very much better.

The amount of cuprous oxid which is contained in a brass or copper scale is a very variable quantity; the ratio between the cuprous and cupric oxids depends upon the circumstances of heating when the scale was formed. For this reason, the amount of sodium bichromate which it is desirable to use with the niter cake varies with different lots of metal. In some cases as small amount as one-tenth of one per cent. dissolved in a pickling bath containing, say, 15 to 20 per cent. by weight of sodium bisulfate is all that is required while in other cases as high as 5 per cent. is necessary in making a solution which will quickly and effectively remove all the scale oxids; removal of the scale oxids being of course understood here, as in all pickling, as not necessarily the absolute solution of all the scale but such an amount of action on it as will allow it to be readily detached, leaving a clean metallic surface. In leaving this clean metallic surface the present pickling bath is particularly efficient, since as stated, the copper is always covered with an under coating of cuprous oxid more adherent than the rest of the scale.

Instead of sodium bisulfate I may use sulfuric acid itself but this I do not find nearly so advantageous as the bisulfate for the noted reasons.

What I claim is:—

1. The process of cleansing metal which comprises pickling the same in a bath containing a bisulfate and a chromate.

2. The process of cleansing copper and copper containing metals which comprises pickling the same in a bath containing sodium bisulfate and an oxidizing agent.

3. The process of cleansing copper and copper containing metals which comprises pickling the same in a bath containing sodium bisulfate and a chromate.

4. The process of cleansing copper and copper containing metals which comprises pickling the same in a bath containing sodium bisulfate and sodium bichromate.

5. As a new composition of matter a pickling bath containing dissolved sodium bisulfate and dissolved sodium bichromate.

In testimony whereof, I affix my signature in the presence of two subscribing witnesses.

EMMET FRANCIS HITCH.

Witnesses:
ALFRED ALLEN,
EDNA M. SMITH.

Copies of this patent may be obtained for five cents each, by addressing the "Commissioner of Patents, Washington, D. C."